United States Patent [19]

Ducrocq

[11] 4,201,986
[45] May 6, 1980

[54] CONTINUOUS WAVE RADAR EQUIPMENT

[75] Inventor: Paul Ducrocq, Paris, France

[73] Assignee: Thomson-CSF, Paris, France

[21] Appl. No.: 958,342

[22] Filed: Nov. 3, 1978

[30] Foreign Application Priority Data

Nov. 8, 1977 [FR] France ............................. 77 33612

[51] Int. Cl.² ............................................. G01S 9/24
[52] U.S. Cl. ...................................... 343/14; 343/17.5
[58] Field of Search .................................. 343/14, 17.5

[56] References Cited

U.S. PATENT DOCUMENTS

| | | | |
|---|---|---|---|
| 3,065,465 | 11/1962 | Wimberly | 343/17.5 X |
| 3,339,198 | 8/1967 | Glegg | 343/14 |
| 3,611,370 | 10/1971 | Frasure et al. | 343/7 A X |

*Primary Examiner*—T. H. Tubbesing
*Attorney, Agent, or Firm*—Cushman, Darby & Cushman

[57] ABSTRACT

A radar equipment operating with a continuous or virtually continuous wave. The radar equipment is provided with a transmitter/receiver assembly. The transmitter is formed by an oscillator stage whose frequency can be modulated. The oscillator stage is associated with a power amplifier stage. The receiver is of the multi-channel super-heterodyne type enabling an echo of a target to be tracked directionally. The transmitter/receiver assembly is capable of operating in two separate modes, namely a first mode in which the transmitted carrier wave $F_o$ is frequency modulated linearly over a range $\Delta F$, and a second mode in which the carrier wave is pure. The transmitter is provided with a sawtooth pattern signal modulator, the oscillator stage being modulated in operation by the sawtooth signal having a repetition period $T_R$. The receiver is provided with at least one amplification channel having a final pass band substantially equal to the reciprocal of period $T_R$, while a generator supplying a local microwave signal coherent in phase with the transmitted signal allows it to be heterodyned by the local microwave signal whose frequency is shifted by an amount equal to the intermediate amplification frequency plus the beat frequency $F_b$ resulting from the transit time of the echo and the Doppler frequency shift.

11 Claims, 9 Drawing Figures

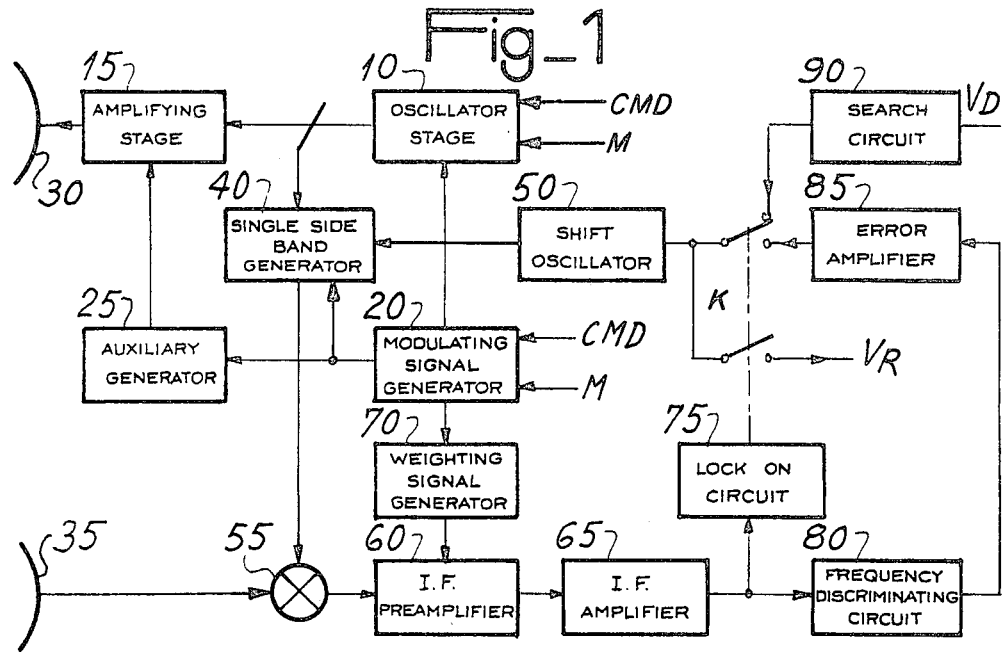
Fig-1
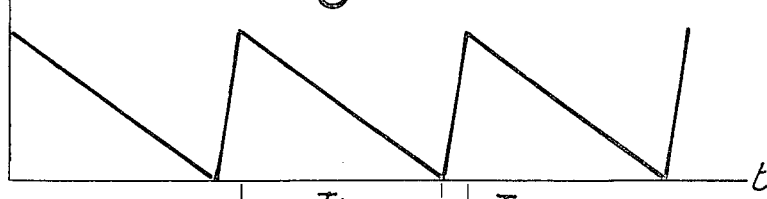
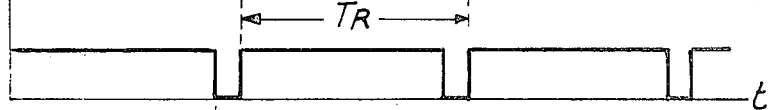
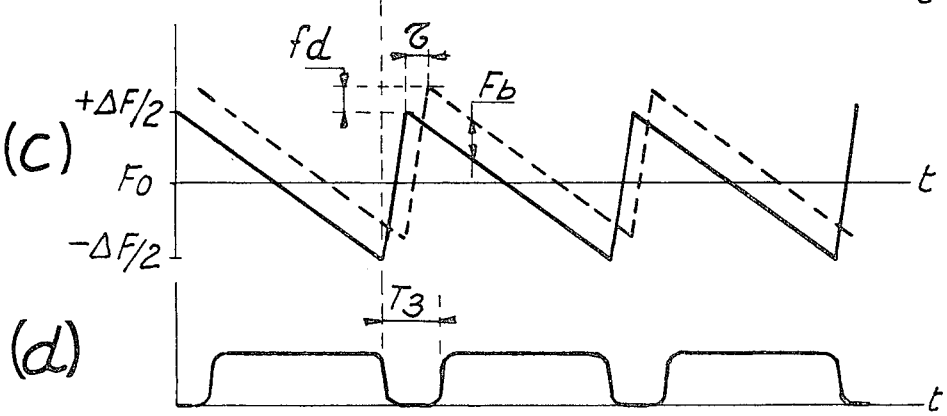
Fig-2

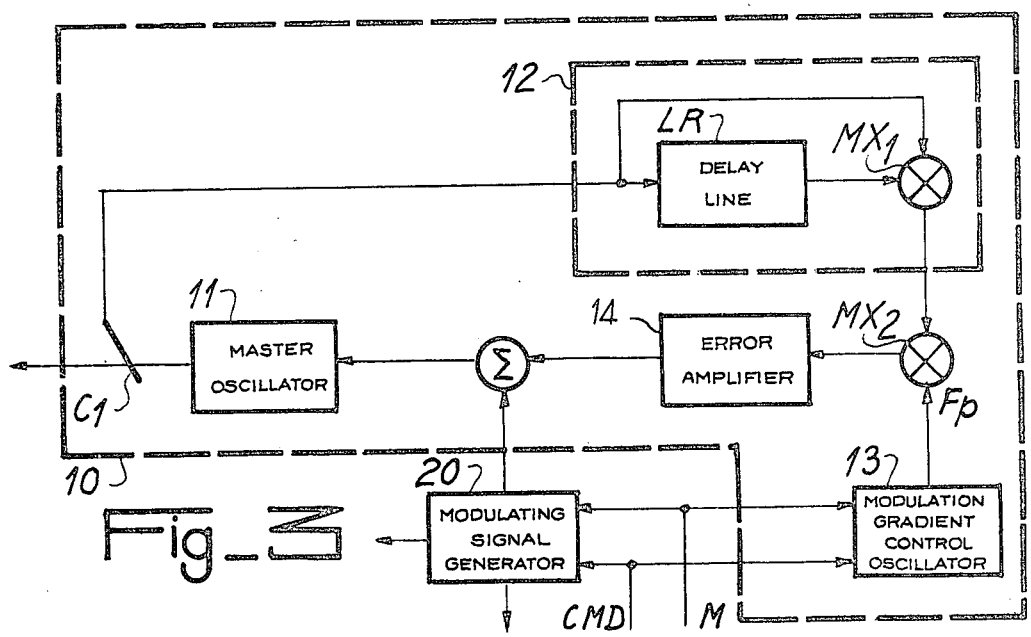
Fig_3
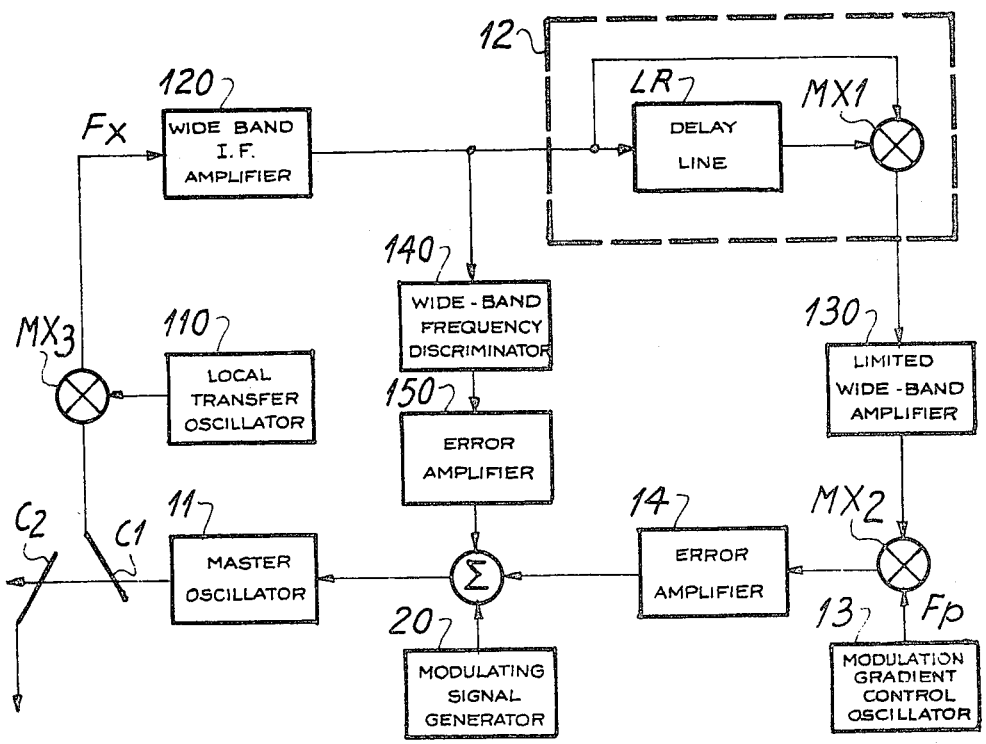
Fig_4-a

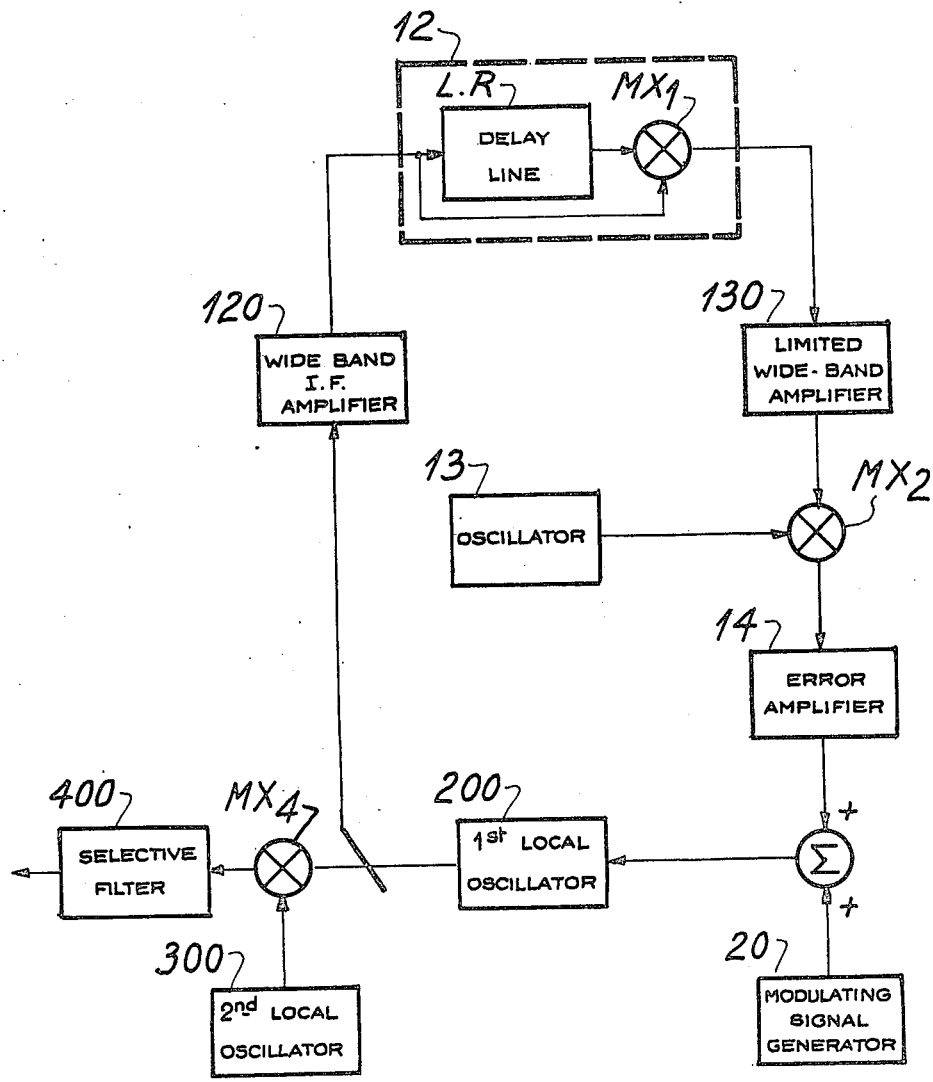
Fig_4-b

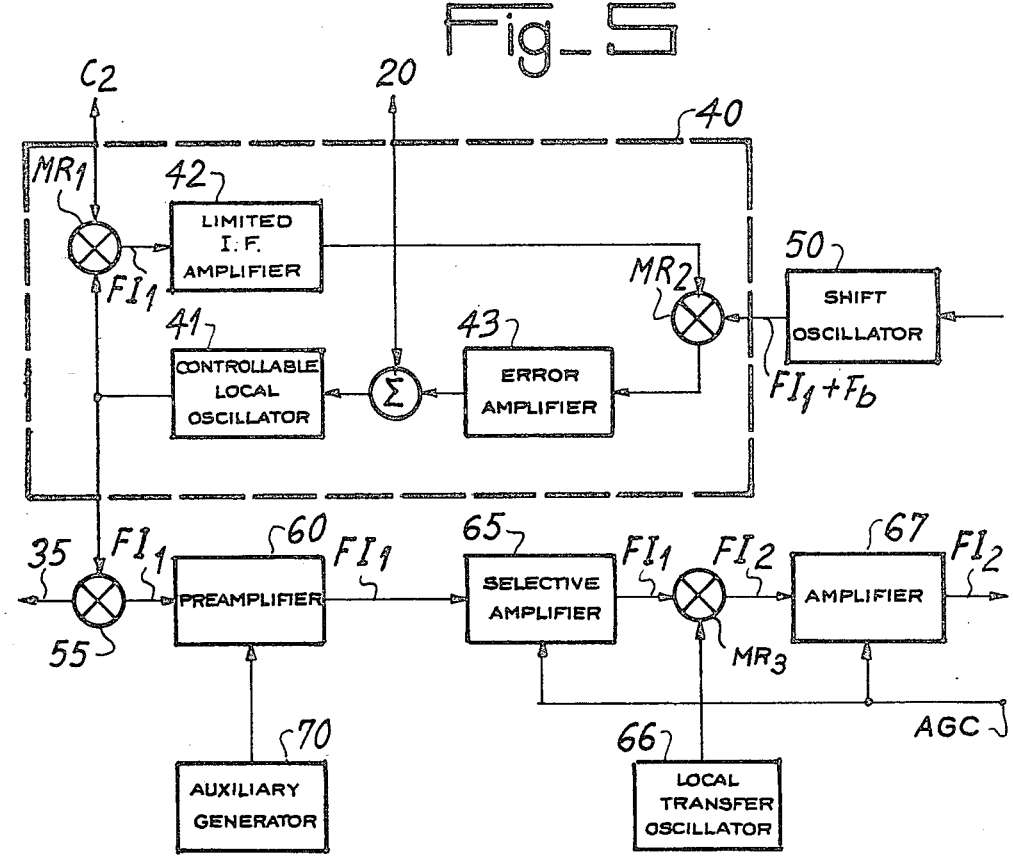
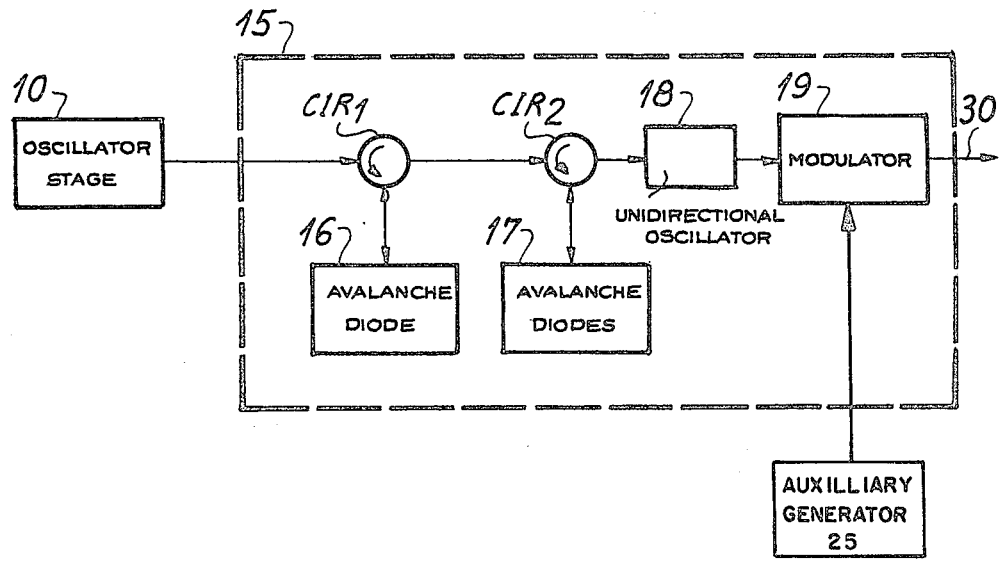

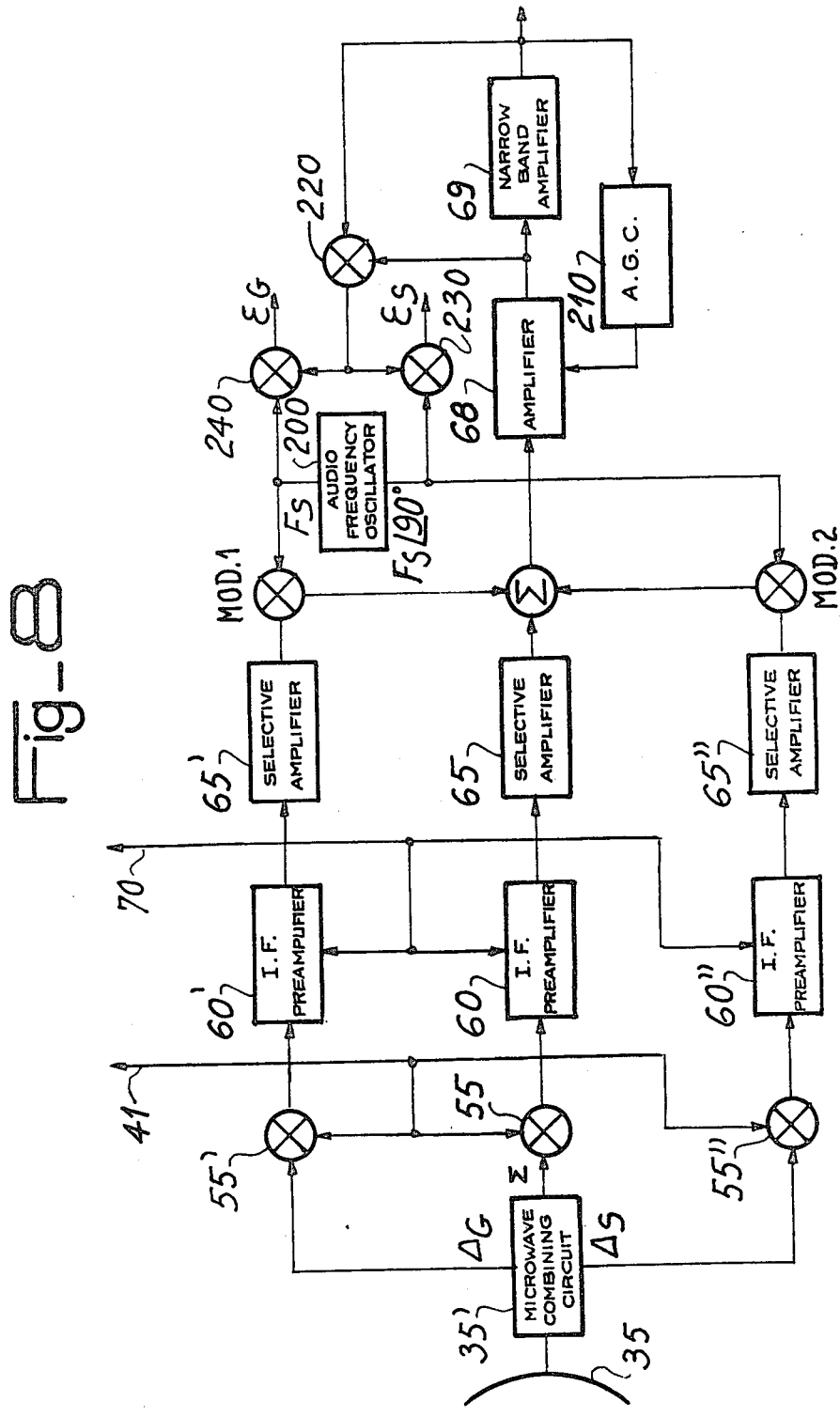

CONTINUOUS WAVE RADAR EQUIPMENT

BACKGROUND OF THE INVENTION

This invention relates generally to radar. More specifically, this invention relates to radar equipment which operates with a continuous or virtually continuous wave and which has a transmitter/receiver assembly capable of operating in two separate modes: namely, a first mode in which the carrier wave transmitted is frequency modulated for obtaining high resolving power with respect to range, and a second mode in which the carrier wave is pure, for obtaining high resolving power with respect to speed.

The invention relates particularly, but not exclusively, to a radar equipment which makes it possible to acquire and track an echo signal superimposed on undesired signals such as sea return signals, also known as clutter.

To detect by radar a target, such as a ship at sea, it is necessary to discriminate the target echo signal coming from from signals which are back-scattered by the surface of the sea. When the speed of movement of the target to be detected is low, or possibly zero, the process which provides adequate contrast between the echo signal and the clutter signals relies on the use of a waveform having a high resolving power with respect to range.

To achieve a high separating power with respect to range it is known to produce radar systems which operate with waveforms made up of pulses whose duration is extremely short, being of the order of one tenth of a microsecond (0.1 $\mu$s) or less, representing a resolving ability with respect to range of approximately 15 m. In pulse radar of this kind, in order to achieve a high probability of detection, it is necessary for the peak power of the transmitted pulses to be high, on the order of tens of kilowatts or more. At the present time, in order to produce radar transmitters capable of providing such power levels reliance is placed on vacuum tubes, generally of the magnetron type, whose limitations and disadvantages are well known. In particular, tubes of this kind require a pulsed, high-voltage power source and a lengthly heating up period for the cathode. There is a condiderable reduction in the reliability of magnetron type vacuum tubes after long periods of storage or inactivity. In addition, it is difficult to produce a transmission/reception duplexer device, given the high level of microwave power and the short duration of the pulses. Furthermore, if military applications are considered, it is known that weapons systems fitted with radar equipment using pulsed operation are made vulnerable, or their effectiveness is considerably reduced, by the fact that radars of this kind are easily detected and located by monitoring receivers available to the enemy.

To overcome the above mentioned technical and operational problems which are inherent in radar equipment operating with short pulses, it has been proposed that pulses of relatively long duration, such as a hundred or more times longer than the duration of the short pulses, be transmitted and that the carrier frequency of these long-duration pulses be varied so as to achieve a high resolving power. Such a system known as pulse compression, is amply described in many publications. One such publication is chapter 20 of "The Radar Handbook", 1970 by M. L. Skolnik. Pulse compression techniques are divided into two major classes. The first such class relies on passive means and the second on active means. The invention herein relates particularly to second class.

Many problems and limitations become apparent when pulse compression techniques are practiced using active means. In effect, they must meet stringent conditions both in respect to the linearity of the frequency modulation of the carrier and with respect to the selectivity and distortion levels of the receiver circuits. These stringent requirements are further enhanced because the product of the frequency deviation F multiplied by the duration T of the pulses, which characterizes the transmitted signal, is considerable, being for example of the order of $10^4$ to $10^5$ or more.

Mention may also be made of a technique similar to pulse compression which relies on a frequency modulated carrier wave and which is made use of in radar sensors such as radioaltimeter units and proximity detectors. In equipment of this kind a precise measurement is required of the range at which a single object lies and resolving ability with respect to range is of subsidary or secondary importance.

The present invention alleviates the disadvantages inherent in prior-art radar techniques.

SUMMARY OF THE INVENTION

The primary object of the invention is to provide means which enable the production of radar equipment having a high resolving power and in particular a high resolving power with respect to range, and to rely solely on solid state components operating at low or moderate voltage levels.

Another object of the invention is to provide means for transmitting adjoining repetitive signals having a long duration T to provide a high probability of detection during a time T and at the same time to provide a high level of discrimination with respect to range.

A further object of the invention is to provide means which enable the resolving power with respect to range to be altered easily and discretely or continuously.

Yet another object of the invention is to provide radar equipment capable of operating in two modes enabling a target echo signal to be acquired and tracked either with respect to range or with respect to speed.

In accordance with the invention, at transmission a continuous or virtually continuous signal is transmitted whose carrier frequency is linearly frequency modulated in a recurrent sawtooth pattern of period $T_R$; at reception, the received signals are amplified coherently in one or more channels having high selectivity. These channels have a pass band on the order of the reciprocal of the repetition period $T_R$, which represents an optimum match between the transmitted signal and the received echo signal.

BRIEF DESCRIPTION OF THE DRAWINGS

Special aspects of the invention and other features will become apparent from the following description which is given with reference to the accompanying drawings and which relates by way of non-limiting example, to one embodiment of the invention. In the drawings the same alphanumeric references correspond to the same items.

In the drawings:

FIG. 1 is a functional block diagram of a radar equipment according to the invention.

FIG. 2 shows the waveforms of the principal signals.

FIG. 3 shows one embodiment of the means which enable the linearity of the frequency modulation of the transmitter to be controlled.

FIGS. 4a and 4b show modifications of the embodiment of FIG. 3.

FIG. 5 shows an embodiment of the reception means.

FIG. 6 shows an embodiment of the microwave power amplifier of the transmitter.

FIG. 8 shows an embodiment of the amplifying channels of the receiver.

DETAILED DESCRIPTION OF THE PREFERRED EMBODIMENT

Figure 7:
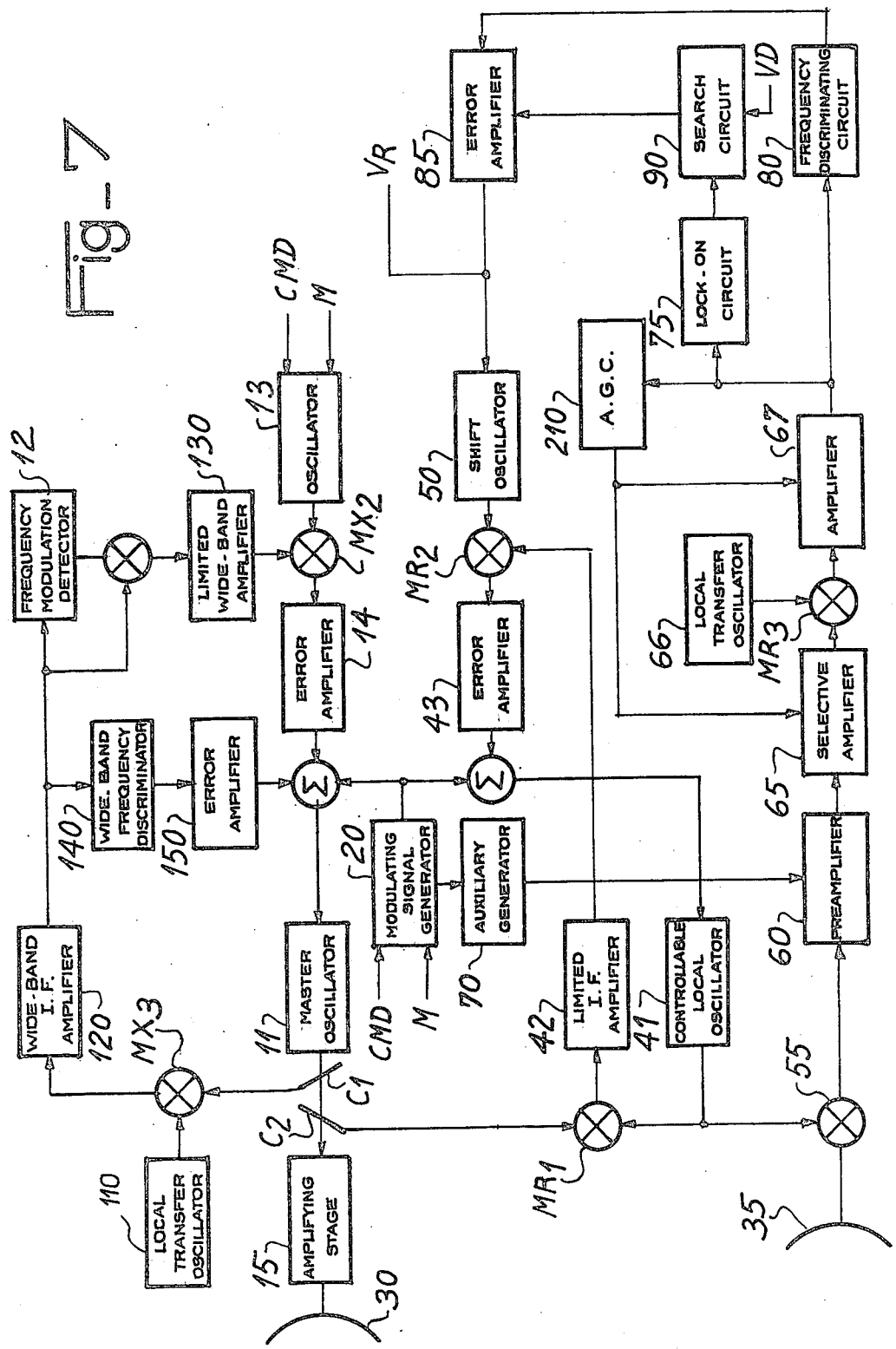
FIG. 7 is a complete diagram of the radar equipment according to the invention.

FIG. 1 shows, in the form of functional blocks, a radar equipment including a transmitter/receiver assembly and the associated antennas. The presence of two antennas 30, 35 is made necessary by the continuous or virtually continuous nature of the transmitted signal.

In accordance with the invention, the transmitter comprises:

an oscillator stage 10 which operates at microwave frequency and in which the instantaneous frequency of the output signal can be shifted electronically. This oscillator includes means which ensure that the frequency modulation is perfectly linear and these means will be described in detail hereafter.

one or more amplifying stages 15 which can possibly be amplitude modulated in an all-or-nothing fashion. This amplification enables an output signal to be supplied whose level is, for example, of some watts or some tens of watts.

a signal generator 20 to generate signals for modulating the oscillator 10. It emits sawtooth signals having a period $T_R$, the amplitude of the sawtooth signals being controlled discreetly or continuously by a control signal CMD. The operation of signal generator 20 may be inhibited by a control signal M. Auxiliary outputs emit synchronizing signals of period $T_R$ which enable auxiliary generators 25 and 70 to be controlled.

a generator 25 for generating auxiliary signals in the form of square-wave signals which enable the output signals supplied by amplifier 15 to be chopped.

A transmitting antenna 30 is mechanically connected to a receiving antenna 35. Antenna 35 may advantageously be of the monopulse type and thus may have three output channels, namely one sum channel $\Sigma$ and two difference channels, $\Delta G$ for the azimuth plane and $\Delta S$ for the elevation plane, the radiation pattern of antenna 30 and and that of antenna 35 advantageously being identical. Given that the transmitter and receiver operate simultaneously, the antennas are physically decoupled with the object of reducing stray signals from the transmitter to the receiver.

In accordance with the invention, the receiver, which is of the multi-channel superheterodyne type (only one channel is shown in FIG. 1) comprises:

a single sideband generator 40 whose function is to shift the frequency of the microwave signal transmitted by an amount equal to the frequency of the signal supplied by a shift oscillator 50, a shift oscillator 50 which emits a signal of an intermediate frequency $F_I$ increased by the beat frequency $F_b$ resulting from the transit time of the radar echo and possibly from the Doppler frequency shift caused by relative motion between the radar equipment and the target, an input mixer 55 which receives at one input port the signals picked up by receiving antenna 35 and at another input port the local signals supplied by generator 40, this mixer emitting signals of intermediate frequency $F_I$, an intermediate frequency preamplifier 60 which is characterised by a low noise level, moderate gain and relatively wide bandwidth, this preamplifier having a gain control input coupled to weighting signals produced by a generator 70, an intermediate frequency amplifier 65 whose passband is relatively narrow, of the same order as the reciprocal of the period $T_R$ of the frequency modulation of the transmitter, a generator 70 for generating weighting signals for coupling to the gain control input of preamplifier 60 to be controlled with the object of restricting the spectral width of the received signals, these modulating signals being synchronous with the signals for frequency modulating the transmitter, a lock-on circuit 75 which enables the existence of an echo signal at the output of the amplifier 65 to be detected, this circuit being responsible for changing the mode of operation of the receiver and allowing a changeover to be made from the search mode to the tracking mode, via a switch K, a frequency descriminating circuit 80 which detects the off center frequency error of the echo signal emitted from the output of the intermediate frequency amplifier 65, an error amplifier 85 which incorporates correcting networks. It supplies an error signal to the shift oscillator 50 for automatically centering the frequency of the received echo signal in the passband of amplifier 65.

a search circuit 90 which emits, for example sawtooth signals. In the search mode of operation it enables the frequency of the shift oscillator 50 to be displaced either across the whole range of beat frequencies $F_b$ or across a reduced range. In this case the mean value of the sawtooth signals is fixed by a voltage $V_D$ corresponding to the central beat frequency $F_b$ designated.

The radar equipment may operate in two separate modes:

a first mode in which the carrier frequency supplied by oscillator 10 is linearly modulated, a second mode in which the carrier frequency supplied by oscillator 10 is unmodulated.

To achieve two separate modes of operation, the signal generator 20 receives a two-state control signal M. In a first state the generator 20 is active and produces sawtooth signals having a repetition period $T_R$ together with synchronising signals for generators 25 and 70 while in a second state the generator 20 is made inactive and as a consequence the operation of generators 25 and 70 is inhibited.

The input voltage to shift oscillator 50 is representative of the beat frequency $F_b$ and use may be made of this voltage as $V_R$ to indicate:

(a) in the mode of operation corresponding to the carrier wave being frequency modulated, a radar to target range which is subject to an error resulting from the Doppler frequency shift, (b) in the mode of operation corresponding to the carrier wave being unmodulated in frequency, the relative radial speed of radar and target.

In a modified embodiment, the frequency of the output signal from the shift oscillator 50 may be used to provide a measurement equivalent to that given by voltage $V_R$.

FIG. 2 shows the waveforms of the principal signals produced by the functional blocks of FIG. 1.

Curve 2a represents the waveform emitted by generator 20, this signal being a recurrent sawtooth signal of period $T_R$ in which time $T_1$ corresponds to the active period of modulating the frequency of the transmitter and time $T_2$ corresponds to the return period of the sawtooth. Period $T_R$ must be less than the decorrelation time of the echo signal returned by targets to be detected and must be sufficiently long to enable the echo signal to be effectively detected. The value of $T_R$ may for example be set at 10 milliseconds and time $T_2$ must be short compared with time $T_1$. It is easy to make $T_2$ 0.01 $T_1$ in practice.

Curve 2b represents the waveform of the signal supplied by generator 25. This signal, which is in the form of a periodic square wave, enables the transmitted signal to be interrupted during the period $T_2$ corresponding to the return time of the sawtooth for modulating the transmitter.

The solid line curve at 2c represents the pattern of frequency excursion, as a function of time, of the transmitted carrier wave between symmetrical limits $+\Delta F/2$ and $-\Delta F/2$ about the central microwave frequency $F_o$, the gradient p of the modulation being equal to the quotient of the frequency deviation $\Delta F$ divided by the active duration $T_1$ of the modulating sawtooth which corresponds substantially to the repetition period $T_R$. The centre frequency $F_o$ may for example lie in the X band (10GHz) and the choice of $\Delta F$ is governed by the desired resolving performance $\sigma$ R with respect to range, the value of $\Delta F$ being $\Delta F = C/2_R$ where C is the speed of propogation of the electromagnetic waves.

By way of example, a nominal resolution with respect to a range of 15 meters requires a value for $\Delta F$ of approximately 10 MHz, which corresponds in the example described, to a value for the gradient $p \simeq \Delta F/T_R = 1$ GHz/s. The gradient p of the frequency modulation may advantageously be made negative in applications where the radar equipment is intended to operate with the targets approaching. Making the gradient negative does in fact prevent the beat frequency $F_b$ from passing through a value of zero at any range.

The requirements for linearity in the frequency modulation of the transmitter are relatively stringent since in fact any accidental divergences in the frequency deviation affect the resolving ability $\sigma$ R with respect to range and, to a certain degree, the performance with respect to detectability. The linearity requirements are more stringent the higher the product $\Delta F \cdot T_R$ and the longer the range or the transit time of the radar signals. It is an object of the invention to provide means which enables these linearity requirements to be met, which means will be described in detaill as follows:

The broken-line curve at 2c represents the frequency deviation pattern of the received signal as a function of time, the received signal being delayed by a time $\tau = 2R/c$ relative to the transmitted signal, where R is the distance from radar to target and c is the speed of propagation of the electromagnetic waves. The frequency difference or beat frequency $F_b$ is given by the formula $$F_b = p\tau + \frac{2 V_r}{\lambda_o} = \frac{2}{c}(pR + V_r F_o)$$

The first term $p\tau$ results from the transit time $\tau$ of the radar signal which is linearly frequency modulated with a gradient p. The second term corresponds to the Doppler frequency shift $$F_d = 2V_r/\lambda_o$$

where $V_r$ represents the relative radial speed of the radar and the target and $\lambda_o$ represents the operating wavelength of the radar equipment. In the example described term $p\tau$ corresponds to 1KHz/$\mu$s and term $F_d$ corresponds to 66 Hz per m/s.

In the mode of operation where the carrier wave is unmodulated the value of p is zero and only the second term has a non-zero value so that $$F_b = 2V_r/\lambda_o$$

Curve 2d shows the form of the signals for weighting the gain of the receiver as a function of real time t. These signals enable the spectrum of the received signals to be limited and thus interference responses to be eliminated. The waveform of the weighting signals may be obtained by using a Hamming Function, or again by means of a signal of the form $1 + \cos 2\pi t/T_R$ where $T_R$ is the repetition frequency. Time $T_3$ is a function on the one hand of the return time $T_2$ of the sawtooth signal and the maximum transit time of the radar signals and on the other hand of the time-constant of the means for linearizing the master oscillator 10 of the transmitter.

It must be clearly understood that the radar equipment according to the invention aims to provide means which enable a range resolution to be achieved which is equivalent to that provided by a radar operating with very short pulses. The measurement of range which is given is ambiguous with respect to speed but the resulting measurement error is not a major disadvantage and a suitable choice of the parameters associated with the introduction of the speed of movement of the platform carrying the equipment enables this error to be minimized if required.

The means provided by the invention will now be described in detail.

FIG. 3 shows a block diagram of the means for enabling linear frequency modulation of the master oscillator stage 10 shown in FIG. 1. Oscillator stage 10 includes a master oscillator 11 which is microwave oscillator having a low power level, such as a few tens of milliwatts, and its instantaneous frequency can be shifted electronically. A small fraction of the output signal from oscillator 11 is extracted by means of a coupler $C_1$ and is applied to an arrangement 12 for detecting the frequency modulation of a carrier wave. This arrangement includes a wide band delay line LR and a microwave mixer MX1. The delay applied by the line is $\tau_0$ and its pass band is greater than $\Delta F$, which is the frequency excursion of the modulation. The output signal from the delay line is applied to one of the two inputs of mixer MX1, the other input being connected to the input of the delay line. The frequency of the beat signal available from the output of mixer MX1, which is equal to $p\tau_o$, where p is gradient of the frequency modulation, is compared with the frequency of the signal supplied by an oscillator 13 for controlling the modulation gradient, by means of a mixer MX2. The output signal from the mixer is applied to the input of an error amplifier 14 and is then added to the sawtooth modulation signal supplied by the generator 20 before being applied to the input of oscillator 11.

Signal CMD, which is applied both to generator 20 and oscillator 13, enables the amplitude of the sawtooth signals to be modified and in addition enables the frequency of the output signal from oscillator 13, and thus the gradient p of the linear modulation of the frequency from the transmitted, to be altered. The change in the gradient p may take place either in discrete steps or continuously. Signal M, which is applied both to generator 20 and oscillator 13, enables the operation of generator 20 and oscillator 13 to be inhibited, as mentioned above, in order to alter the mode of operation of the radar equipment.

To obtain a short response time from the loop for linearizing the modulation of the frequency of the master oscillator 11, the product $p\tau_o$ must be large compared with the reciprocal of the repetition period $T_R$ of the modulation. For example, with $T_R = 10$ milliseconds and $p = 10$ milliseconds and $p = 1$ GHz, a value of $\tau_o = 10$ μs for the delay caused by the line corresponds to a beat frequency of 10 KHz at the output of mixer MX1 and thus to a related value for the frequency $F_p$ of the signal supplied by oscillator 13.

It may prove difficult to produce a low-loss microwave delay line applying a delay of 10 μs whereas it is possible to obtain from commercial sources delay lines for which the size of the product of pass band multiplied by delay is greater than 100 and which operate in the 100 MHz frequency band.

FIG. 4a shows the modifications which have to be made to the layout in FIG. 3 when a delay line which operates at an intermediate frequency Fx is used. The microwvve frequency signal available at the output of coupler C₁ is shifted to an intermediate frequency $F_X$ by means of a frequency changing stage including a local transfer oscillator 110 and a microwave frequency mixer MX3. The output signal from mixer MX3 is amplified via a wide-band intermediate frequency amplifier 120 and is then applied to the arrrangement 12 for detecting the linearity of the frequency modulation. A limited wide-band amplifier 130 is inserted between arrangement 12 and mixer MX2 with the object of minimising the effects of any possible amplitude distortion caused by the components situated upstream. Depending upon the intrinsic frequency stability of oscillators 11 and 110, it may be advisable to insert in the circuit an automatic frequency control loop which enables the mean frequency of the signals supplied by the oscillators to be slaved. This loop comprises a wide-band frequency discriminator 140, and an error amplifier 150 into which is incorporated a correcting network enabling the response time of the loop to be. The loop response time must be high compared with the frequency $T_R$ of the signals for modulating the frequency of the transmitter. The output signal from amplifier 150 may be applied either to oscillator 11, as shown in the Figure, or to oscillator 110.

FIG. 4b shows, in block diagram, a modified embodiment of the means for enabling linear modulation of the frequency of the radar transmitter.

In this embodiment, linear frequency modulation is applied to a local oscillator 200 which operates at an intermediate frequency lying for example in the 100 MHz band. The output signal from this oscillator is shifted to the carrier frequency of the radar transmitter and in addition a small portion of the output signal is applied to the input of the loop for linearizing the frequency modulation.

The frequency shifting means is formed by a local microwave oscillator 300 which operates at the transmission carrier frequency and a mixing stage MX4 whose beat signal is filtered by a known selective microwave filter 400.

The means which enable the frequency modulation to be linearized are formed by blocks 120, 12, 130, MXI, MX2, 13, 14 and 20 identical to the blocks which bear the same reference numerals in FIG. 4a and which were described above.

FIG. 5 shows, in block diagram, an embodiment of the reception circuits. It will be recalled that the overall pass band of the intermediate frequency amplification chain must be narrow, of the same order as the reciprocal of the repetition period $T_R$ of the frequency modulation of the transmitter, and that the selectivity of the amplification chain must be high in order to eliminate undesired signals, in particular signals resulting from direct or indirect coupling between the transmitting and receiving antennas, and in order to make possible effective discrimination between th echo signal from a target and signals back-scattered from the surface of the sea. In addition, to prevent interference signals resulting from non-linearities in the active components such as transistors, the filters which determine the selectivity of the intermediate frequency amplifier must be coupled at the input of the amplifier.

To meet these requirements, in particular the requirement relating to the selectivity of the receiver, it is advisable to use filters having piezo-electric resonators, (quartz-filters), and to use a relatively low nominal intermediate on the order of a few MHz. To allow this to be done, the amplification chain of the receiver is formed by a plurality of components which operate at various intermediate frequencies:

a preamplifier 60 having a low noise factor, moderate gain to reduce modulation phenomena, and a pass band which is compatible with the frequency spectrum of the weighting signals supplied by generator 70, a selective amplifier 65 having a pass band on the order of ten to thirty times the final pass band, which operates at a frequency $FI_1$ lying in the megahertz band, and having a quartz filter for determining its selectivity coupled at its input, a frequency shifter including a mixer MR3 and a local transfer oscillator 66, a relatively narrow band amplifier 67 which operates at an intermediate frequency $FI_2$ lying in the 100 KHz band, including one or more selective filters which may advantageously be quartz filters.

The choice of a relatively low intermediate frequency $FI_1$, combined with the need for the local microwave signal feeding the input mixer 55 of the receiver to be coherent to the transmitted signal, results in a generator 40 having particular characteristics. Generator 40 includes a microwave frequency oscillator which is slaved to the phase of the transmitted signal and whose frequency is shifted by an amount $FI_1 + F_b$ supplied by a shift oscillator 50. Generator 40 includes an electronically controllable microwave frequency local oscillator 41 whose output signal is coupled to one input port of input mixer 55 of the amplification chain of the receiver and whose output signal is also coupled to a mixer MR1 which receives a reference signal available from the output of the coupler $C_2$ (shown in FIG. 4). The output signal from mixer MR1 is amplified by the limited intermediate frequency amplifier 42. The pass band of amplifier 42 must be extremely wide in order to minimise its transfer time. The output signal from amplifier 42 is mixed with the signal supplied by the shift oscillator 50 in a mixer MR2. The error signal at the output of mixer MR2 is amplified in an error amplifier 43 into which are incorporated correcting networks which determine the transfer function of the automatic phase loop so formed. The closed loop pass band of this phase control arrangement must be adequate for the phase of the signal supplied by oscillator 41 to be coherent with the phase of the transmitted signal. With a view to anticipating the frequency excursion of the transmitted signal, the output signal from the error amplifier 43 is added to the sawtooth signal supplied by generator 20.

FIG. 6 shows, block diagram, an embodiment of the microwave frequency power amplifier 15 of the transmitter shown in FIG. 1. The output signal supplied by master oscillator 10, which operates at a low power level (on the order of a few tens of miliwatts), is amplified in a series of stages such as, for example, a series of stages of the injection synchronized type. The input stage comprises a microwave circulator CIR .1 associated with an avalanche diode 16 and the output stage, which is of identical configuration, comprises a circulator CIR.2 associated with one or more avalanche diodes 17 connected in parallel. Depending upon the output power level required, the number of amplification stages may be varied, as may also the number of diodes which are associated in parallel. The technology of amplifiers employing injection synchronized diodes is well known and will not be described in any greater detail. For frequency bands below the X band, the diode components may be replaced by transistors. The transmitted signal may be chopped either by feeding avalanche diodes with square wave voltages or by means of a modulator 19 which employs diodes of the PIN type and which is coupled to signals from generator 25. A unidirectional oscillator 18 may advantageoulsly be coupled between the output of the circulator CIR.2 and the modulator 19. As mentioned above, the use of a modulator 19 or chopper is optional.

FIG. 7 is a diagram of a complete radar system according to the invention which operates in two modes, namely a first mode wherein the carrier wave is linearly frequency modulated and which enables the echo from a fixed or slightly mobile target to be acquired and tracked, and a second mode wherein the carrier wave is unmodulated and which allows the echo from a target moving at high speed to be acquired and tracked. FIG. 7 includes the items shown in FIGS. 1, 4 and 5 which have already been described above. It should be noted that the microwave power amplifier 15 operates continuously; in fact generator 25 is optional since, when the weighting signals supplied to the receiver by generator 70 provide adequate blocking during the time $T_2$ corresponding to the return time of the sawtooth signal it is not necessary to chop the output signal from the power stage 15.

A different embodiment of the search circuit 90 is shown. In this embodiment search circuit 90 makes use of the capacitance of the low-pass correcting network within error amplifier 85 in order to reduce transitory phenoma at the time of changes from the search mode to the tracking mode. Finally, an automatic gain control circuit 210 has been added. As will be described below, the addition of supplementary means to the receiver, in particular one or more amplification channels, enables the target to be tracked directionally.

FIG. 8 shows, in block diagram, an embodiment of the amplification channels of the receiver which enable error signals for the direction of aim to be produced with the object, in particular, of slaving the directions of the antennas to the target being tracked.

The receiving antenna 35 has, associated with its reflector, a microwave combining circuit 35' which supplies a $\Sigma$ channel signal and two difference signals $\Delta G$ and $\Delta S$ corresponding respectively to the aiming errors of the antenna in azimuth and elevation. After a coherent frequency change in the input mixer 55, the $\Sigma$ signal is amplified in the intermediate frequency preamplifier 60 and then applied to the input of the selective amplifier 65 which acts as a highly selective frequency gate. The combined gain of components 60 and 65 is set at a relatively low (unity gain) level so that it remains stable in the course of time. Components 60' and 60'', 65' and 65'' are identical by construction to components 60 and 65. There are thus available at the outputs of amplifiers 65, 65' and 65'' three signals which have been subjected to the same amplification and the same filtering with respect to frequency. With the object of standardizing the levels of these three signals, the two difference signals $\Delta G$ and $\Delta S$ are multiplexed with respect to frequency with the $\Sigma$ signal. The frequency multiplexing is performed by means of carrier suppressing modulators MOD.1 and MOD.2 which are controlled by the signals from an audio frequency oscillator 200 which emits two orthogonal signals each having frequency $F_S$. The value of frequency $F_S$ is greater than the pass band of the selective amplifiers 65, 65' and 65''. The composite signal resulting from this multiplexing operation is amplified by an amplifier 68, having a pass band that is greater than twice the multiplexing frequency $F_S$, and is then filtered in a narrow band amplifier 69 which passes only the component of the signal corresponding to the $\Sigma$ channel. An automatic gain control circuit 210 enables the output level of the composite signal to be standardised. The output signal from amplifier 69 is applied to a coherent demodulator 220 which also receives the composite signal applied to the input of amplifier 69. The components of the output signal from demodulator 220 are extracted by phase-/amplitude detectors 230 and 240 which supply directional error signals $\Delta S$ and $\Delta G$ respectively. These signal $\Delta S$, $\Delta G$ enable the directions in which the antennas 30 and 35 point to be controlled by means of servo-mechanisms which are not shown in FIG. 8 and which, being well known, will not be described.

In addition to the advantages already mentioned, the radar, as provided, has the advantage of dispensing with vacuum tubes and their disadvantageous warm-up delay. The transmitted waveform, which is characterised in that it is continuous and thus of low peak power, ensures that the platform carrying the radar equipment is of low detectability and its continuous nature gives rise to little interference with the environment and the internal circuits for processing the signals. Since virtually all the amplification of the received signal takes place in a narrow, intermediate frequency band, radar is less sensitive to interference signals and in particular, to signals of industrial frequency than is conventional radar.

The invention is not restricted to the various embodiments described and may be modified in other ways both in the applications described and in other possible applications. Thus, the quantitative values of the principal parameters may be varied as a function of the operational requirements which the equipment has to meet, these parameters being in particular the operating wavelength, the repetition period $T_R$ and the frequency deviation $\Delta F$ of the frequency modulation of the carrier wave transmitted by the transmitter, and the final pass band B of the receiver.

The invention may be applied to the radar detection of objects in both the civil and military fields.

What is claimed is:

1. A radar equipment operating with a virtually continuous wave and comprising a transmitter/receiver assembly, the transmitter being formed by an oscillator stage whose frequency can be modulated, said oscillator stage being associated with a power amplifier stage, the receiver being of the superheterodyne type and in particular the multi-channel superheterodyne type which enables the echo of a target to be tracked directionally, wherein said transmitter/receiver assembly is capable of operating in two separate modes, namely a first mode in which the transmitted carrier wave $F_o$ is frequency modulated linearly over a range $\Delta F$, and a second mode in which the carrier wave is pure, said transmitter further including means for modulating said oscillator stage linearly through a sawtooth pattern signal whose repetition period is $T_R$, said receiver further including, on the one hand, at least one amplification channel whose final pass band is substantially equal to the reciprocal of the period $T_R$ and whose gain is weighted periodically at this same rate $T_R$, and, on the other hand, a generator which supplies a local microwave signal whose phase is coherent with the transmitted signal and whose frequency is shifted by an amount equal to the intermediate amplification frequency plus the beat frequency $F_b$ resulting from the transit time of the echo and the Doppler frequency shift.

2. Radar equipment according to claim 1, wherein said oscillator stage of said transmitter includes a loop for controlling frequency linearity comprising:
    a master oscillator having an output and a control input for controlling its output frequency;
    a detector coupled to said output of said master oscillator for detecting the frequency modulation gradient p of the output signal from said master oscillator and generating an output signal related to said frequency modulation gradient;
    a gradient reference oscillator for supplying a local signal having a predetermined frequency $F_p$,
    a comparator for comparing said output signal of said detector with the output signal of said gradient reference oscillator having fixed frequency $F_p$, said comparator supplying an output signal, and
    an error amplifier coupled to the output of said comparator for amplifying said output signal of said comparator, said error amplifier supplying an amplified error signal for controlling said control input of said master oscillator.

3. Radar equipment according to claim 2, wherein said detector for detecting the frequency modulation gradient comprises:
    a delay line coupled to the output of said master oscillator and having delay $\tau x$ is such that the product of said delay $\tau x$ multipled by the required modulation gradient p is equal to the value of frequency $F_p$; and
    a mixer having first and second input ports and an output port, said first input port coupled to the output of said master oscillator and said second input coupled to the output of said delay line whereby said second input receives the output signal from said master oscillator after delay $\tau x$ through said delay line.

4. Radar equipment according to claim 3, wherein said loop for controlling frequency linearity operates at an intermediate frequency $F_x$ and further includes a frequency transfer stage coupled between said detector and the output of said master oscillator.

5. Radar equipment according to claim 4, wherein said loop for controlling frequency linearity further includes an automatic frequency control loop for slaving the frequency of said master oscillator, said control loop being centred on said intermediate frequency $F_x$, said automatic frequency control loop comprising series connected between the output of said frequency transfer stage through a wide band I.F. amplifier and the control input of said master oscillator:
    a wide-band frequency discriminator and
    an error amplifier.

6. Radar equipment according to claim 1, wherein the power amplifier of the transmitter includes means which enable the transmitted microwave signal to be interrupted at the repedition rate $T_R$.

7. Radar equipment according to claim 1, wherein one amplification channel of the receiver includes, centred on an intermediate frequency $FI_1$, a low gain, nonselective preamplifier and a selective amplifier and, centred on an intermediate frequency $FI_2 < FI_1$, a narrow band amplifier whose bandwidth is equal to approximately the reciprocal of the repetition period $T_R$.

8. Radar equipment according to claim 1, wherein, in said receiver, the generator which emits a local microwave signal is an oscillator whose frequency is controllable electronically and is, on the one hand, shifted by said sawtooth pattern signal of repetition period $T_R$ and, on the other hand, slaved in respect of phase to the microwave signal supplied by the oscillator stage of the transmitter with a frequency shift equal to the frequency $F_b$.

9. A radar equipment operating with a virtually continuous wave and comprising:
    a transmitter/receiver assembly,
    the transmitter including an oscillator stage whose frequency can be modulated,
    said oscillator stage being associated with a power amplifier stage,
    the receiver being of the superheterodyne type and in particular the multichannel superheterodyne type which enables the echo of a target to be tracked directionally,
    said transmitter/receiver assembly being capable of operating in two separate modes, namely a first mode in which the transmitted carrier wave Fo is frequency modulated linearly over a range $\Delta F$, and a second mode in which the carrier wave is unmodulated,
    said transmitted further including means for modulating said oscillator stage linearly through a sawtooth pattern signal having a repetition period TR, the gradient p of the frequency modulation equal to F/TR being negative,
    said receiver further including at least one amplification channel having a final pass-band substantially equal to the reciprocal of the period TR and having a gain that is weighted periodically at this same rate TR, and said receiver further including a generator which supplies a local microwave signal having a phase coherent with the transmitted signal and having a frequency shifted by an amount equal to the intermediate amplification frequency plus the beat frequency Fb resulting from the transit time of the echo and the Doppler frequency shift.

10. A radar equipment operating with a virtually continuous wave comprising:

a transmitter/receiver assembly, said transmitter including an oscillator stage having a frequency that can be modulated, said oscillator stage being associated with a power amplifier stage, the receiver being of the superheterodyne type and in particular the multi-channel superheterodyne type which enables the echo of a target to be tracked directionally, said transmitter/receiver assembly being capable of operating in two separate modes, namely a first mode in which the transmitted carrier wave $F_o$ is frequency modulated linearly over a range $\Delta F$, and a second mode in which the carrier wave is unmodulated, said transmitter further including means for modulating said oscillator stage linearly through a sawtooth pattern signal having a repetition period TR, said means for modulating said oscillator stage linearly enabling the frequency modulation of the transmitter to be inhibited, said receiver further including at least one amplification channel having a final pass band substantially equal to the reciprocal of the period TR and having a gain weighted periodically at this same rate TR, and, further including, a generator which supplies a local microwave signal having phase coherent with the transmitted signal and having frequency shifted by an amount equal to the intermediate amplification frequency plus the beat frequency $F_b$ resulting from the transit time of the echo and the Doppler frequency shift, and said means for modulating said oscillator stage linearly further enabling the gain of said amplification channel of the receiver to be weighted when operating in said second mode in which the carrier wave is unmodulated.

11. A radar equipment operating with a virtually continuous wave comprising:

a transmitter/receiver assembly, said transmitter including an oscillator stage having frequency that can be modulated, said oscillator stage being associated with a power amplifier stage, the receiver being of the superheterodyne type and in particular of the multichannel superheterodyne type which enables the echo of a target to be tracked directionally, said transmitter/receiver assembly being capable of operating in two separate modes, namely a first mode in which the transmitted carrier wave $F_o$ is frequency modulated linearly over a range $\Delta F$, and a second mode in which the carrier wave is unmodulated, said transmitter further including means for modulating said oscillator stage linearly through a sawtooth pattern signal whose repitition period is $T_p$ said means for modulating said oscillator stage linearly enabling the gradient of frequency modulation to be changed when operating in the mode where the carrier wave is frequency modulated, said receiver further including at least one amplification channel having a final pass band substantially equal to the reciprocal of the period TR and having a gain weighted periodically at this same rate TR, and said receiver further including a generator which supplies a local microwave signal having phase coherent with the transmitted signal and having a frequency shifted by an amount equal to the intermediate amplification frequency plus the beat frequency $F_b$ resulting from the transit time of the echo and the Doppler frequency shift.

* * * * *